(12) United States Patent
Ray et al.

(10) Patent No.: US 8,902,085 B1
(45) Date of Patent: Dec. 2, 2014

(54) INTEGRATED 3D AUDIOVISUAL THREAT CUEING SYSTEM

(75) Inventors: Michael S. Ray, Carmel, IN (US); Eric K. Moore, Indianapolis, IN (US); Todd A. Lovell, Carmel, IN (US); James A. Negro, Plainfield, IN (US); Jason J. Braun, New Palestine, IN (US)

(73) Assignee: Raytheon Company, Waltham, MA (US)

( * ) Notice: Subject to any disclaimer, the term of this patent is extended or adjusted under 35 U.S.C. 154(b) by 623 days.

(21) Appl. No.: 13/109,417

(22) Filed: May 17, 2011

(51) Int. Cl.
| | | |
|---|---|---|
| H01Q 17/00 | (2006.01) | |
| G01S 7/42 | (2006.01) | |
| G02B 27/14 | (2006.01) | |
| G08B 21/00 | (2006.01) | |
| G08G 5/04 | (2006.01) | |
| G08B 23/00 | (2006.01) | |
| G01C 23/00 | (2006.01) | |
| G01C 21/00 | (2006.01) | |

(52) U.S. Cl.
USPC ........... 340/961; 340/963; 340/964; 340/971; 340/980; 340/945; 359/630; 359/632; 642/14; 642/2; 642/62

(58) Field of Classification Search
USPC .................................................. 340/944–983
See application file for complete search history.

(56) References Cited

U.S. PATENT DOCUMENTS

| | | | | |
|---|---|---|---|---|
| 4,386,355 A | * | 5/1983 | Drew et al. | 342/357.2 |
| 4,843,459 A | * | 6/1989 | Perrin et al. | 348/116 |
| 5,061,930 A | * | 10/1991 | Nathanson et al. | 342/13 |
| D358,150 S | | 5/1995 | Lewis, Jr. et al. | |
| 5,511,218 A | * | 4/1996 | Castelaz | 718/102 |
| 5,838,262 A | * | 11/1998 | Kershner et al. | 340/945 |
| 6,396,577 B1 | * | 5/2002 | Ramstack | 356/141.1 |
| 6,404,442 B1 | * | 6/2002 | Hilpert et al. | 715/727 |
| 6,429,446 B1 | * | 8/2002 | Labaugh | 250/504 R |
| 7,230,221 B2 | * | 6/2007 | Busse et al. | 250/203.6 |
| 7,328,644 B2 | * | 2/2008 | Vickroy | 89/1.11 |
| 7,495,198 B2 | * | 2/2009 | Ari | 244/3.1 |
| 7,710,654 B2 | * | 5/2010 | Ashkenazi et al. | 359/630 |
| 7,733,465 B2 | * | 6/2010 | Gidseg et al. | 356/29 |
| 7,916,278 B2 | * | 3/2011 | Smith | 356/4.01 |
| 7,964,830 B2 | * | 6/2011 | Olden et al. | 244/3.1 |
| 2004/0141622 A1 | | 7/2004 | Squibbs | |
| 2005/0001755 A1 | * | 1/2005 | Steadman et al. | 342/14 |
| 2006/0238877 A1 | * | 10/2006 | Ashkenazi et al. | 359/630 |
| 2006/0250280 A1 | * | 11/2006 | Chen et al. | 340/974 |
| 2007/0169616 A1 | * | 7/2007 | Vickroy | 89/1.11 |
| 2008/0111728 A1 | * | 5/2008 | Stevens | 342/14 |
| 2009/0174589 A1 | * | 7/2009 | Moraites | 342/14 |
| 2010/0175573 A1 | * | 7/2010 | Cornett et al. | 102/201 |
| 2013/0051560 A1 | * | 2/2013 | Ray et al. | 381/2 |

* cited by examiner

*Primary Examiner* — Steven Lim
*Assistant Examiner* — Muhammad Adnan
(74) *Attorney, Agent, or Firm* — Lando & Anastasi, LLP

(57) ABSTRACT

An integrated audiovisual threat warning system configured to detect a threat, estimate a relative location of origin of the threat with respect to a host platform with which the system is associated, and to warn an occupant of the host platform of the threat. The system includes an audio processor configured to receive a warning tone, geo-spatial coordinate data from the host platform, and the estimated relative location of origin of the threat, and to process the warning tone based on the geo-spatial coordinate data and the direction information to generate a directional audio warning signal. The system also includes a plurality of speakers configured to audibly project the directional audio warning signal to audibly identify the estimated relative location of origin of the threat, and a display control unit configured to display the estimated relative location of origin of the threat overlaid on a map.

17 Claims, 8 Drawing Sheets

INTEGRATED 3D AUDIOVISUAL THREAT CUEING SYSTEM

BACKGROUND

Threat warning systems are used to detect a weapon directed at a target, with the target usually containing the threat warning system. For example, military aircraft may include missile warning systems to detect missiles fired at the aircraft. Referring to FIG. 1 there is illustrated a functional block diagram of one example of a missile warning system 100 that detects the presence of a missile 110 (or other threat) fired at the host platform on which the system 100 is installed. The missile warning system 100 includes a detector system 120, including for example, a sensor array 130 and associated optics 140 configured to detect missiles 110 within a field of view of the sensor array. The sensor array 130 may typically include infrared sensors that capture images of the field of view. Processing circuitry 150 receives the images from the sensor array 130 and analyzes the images to detect a missile 110. In some systems, the processing circuitry 150 may generate a general directional determination indicating an area from which the missile 110 may have been launched and optionally an arrival angle at which the missile is approaching the host platform. For example, some systems divide the field of view of the sensor array 120 into quadrants by azimuth angle, and identify the quadrant from which the missile likely originated. Presently, information to warn an occupant of the host platform (e.g., the pilot of an aircraft) of the approaching missile is generally presented to the occupant through a simple display 160, for example, an arrow pointing to the identified quadrant (e.g., forward-right, forward-left, rearward-right, or rearward-left), and monaural audio, for example, a warning tone, from audio system 170.

SUMMARY OF INVENTION

Aspects and embodiments are directed to an integrated three-dimensional (3D) audiovisual threat warning system that provides a user with composite situational awareness through spatial audio and visual cues.

According to one embodiment, an integrated audiovisual threat warning system comprises a threat detection sub-system configured to detect a threat and, responsive to detection of the threat, to generate a warning tone and an estimated relative location of origin of the threat with respect to a host platform with which the threat warning system is associated, an audio processor coupled to the threat detection sub-system and configured to receive the warning tone, geo-spatial coordinate data from the host platform, and the estimated relative location of origin of the threat, and to process the warning tone based on the geo-spatial coordinate data and the direction information to generate a directional audio warning signal, and a plurality of speakers coupled to the audio processor and configured to audibly project the directional audio warning signal to audibly identify the estimated relative location of origin of the threat. The integrated audiovisual threat warning system further comprises a display screen, and a video processor coupled to the threat detection sub-system and to the display screen, and configured to receive the estimated relative location of origin of the threat and to control the display screen to display the estimated relative location of origin of the threat overlaid on a map.

In one example, the plurality of speakers is mounted in a helmet. The integrated audiovisual threat warning system may further comprise a monocle mounted to the helmet and coupled to the video processor, and wherein the video processor is configured to control the monocle to display an indication of the estimated relative location of origin of the threat. In one example, the integrated audiovisual threat warning system further comprises a helmet tracking system coupled to the video processer and configured to track a pointing direction of the monocle and to provide the pointing direction to the video processor. In another example, the video processor is further configured to determine whether the pointing direction corresponds to a direction of the estimated relative location of the origin of the threat and, responsive to the determination, alter the indication of the estimated relative location of the origin of the threat displayed by the monocle. In another example, the video processor is further configured to calculate a region of overlap between estimated relative locations of origin of successively detected threats and to control the display screen to display the region of overlap overlaid on the map and visually distinguished from the estimated relative location of origin of the threat. The threat detection sub-system may be a missile warning system, for example.

According to another embodiment, a method of warning an occupant of a host platform of a threat comprises detecting a first threat, generating a warning tone responsive to detection of the first threat, determining a first estimated location of origin of the first threat, displaying the first estimated location of origin of the first threat on a map, the first estimated location of origin of the first threat being fixed to the map, processing the warning tone based on geo-spatial coordinate data from the host vehicle and the first estimated location of origin of the first threat to produce a directional audio warning signal, and audibly projecting the directional audio warning signal to audibly identify the first estimated relative location of origin of the first threat.

In one example, the method further comprises detecting a second threat, determining a second estimated location of origin of the second threat, calculating a region of overlap between the first estimated location of origin of the first threat and the second estimated location of origin of the second threat, and displaying the region of overlap on the map, visually distinguished from the first estimated location of origin of the first threat. In another example, the method further comprises displaying the second estimated location of origin of the second threat on the map. The method may further comprise determining a facing direction of a monocle configured for use by the occupant, and determining whether the facing direction is toward the first estimated location of origin of the first threat. In one example, method further comprises displaying in the monocle an icon representative of the first estimated location of origin of the first threat responsive to determining that the facing direction is toward the first estimated location of origin of the first threat. In another example, the method further comprises displaying in the monocle a signal point of interest vector line pointing in a direction of the first estimated location of origin of the first threat responsive to determining that the facing direction is not toward the first estimated location of origin of the first threat. Audibly projecting the directional audio warning signal may include playing a sound in helmet speakers, for example, the helmet being configured for use by the occupant. In one example, the method further comprises monitoring movement of the helmet, and updating the directional audio warning signal based on the movement to adjust the audible identification the first estimated relative location of origin of the first threat responsive to the movement. In another example, the method further comprises updating the geo-spatial coordinate data based on movement of the host platform, and processing the warning tone based on the updated geo-spatial coordinate data to update directional audio warning signal to adjust the audible identification the first estimated relative location of origin of the first threat responsive to the movement.

According to another embodiment, an audio threat warning system comprises an audio tone generator configured to generate a warning tone responsive to detection of a threat, an audio processor unit configured to receive the warning tone, geo-spatial coordinate data from a host platform with which the threat warning system is associated, and direction information indicating a direction, relative to the host platform, of an estimated location of origin of the threat, and to process the warning tone based on the geo-spatial coordinate data and the direction information to generate a directional audio warning signal, and a plurality of speakers coupled to the audio processor unit and configured to audibly output the directional audio warning signal including an audible indication of the direction, relative to the host platform, of the estimated location of origin of the threat.

In one example, the audio threat warning system further comprises a helmet including a head tracking system, the plurality of speakers being mounted in the helmet. The head tracking system may be configured to monitor movement of the helmet and provide a movement signal representative of the movement to the audio processor, and the audio processor may be further configured to process the warning tone based on the movement signal to update the audible indication of the direction of the estimated location of origin of the threat responsive to the movement of the helmet. In another example the audio threat warning system is an audiovisual threat warning system further comprising a threat detection sub-system configured to detect threats and to determine the estimated location of origin of each threat relative to the threat warning system, and a control display unit coupled to the threat detection sub-system and configured to receive the estimated locations of origin of the threats and to display the estimated locations of origin of the threats overlaid on a map, the control unit further configured to calculate a region of overlap between an estimated location of origin of a first threat and an estimated location of origin of a subsequent threat, and to display the region of overlap visually distinguishable from the estimated locations of origin of the first and subsequent threats.

Another embodiment is directed to a method of audibly warning of a threat, the method comprising receiving a warning tone responsive to detection of the threat, receiving geo-spatial coordinate data from a host platform, receiving direction information indicating a direction, relative to the host platform, of an estimated location of origin of the threat, processing the warning tone based on the geo-spatial coordinate data and the direction information to generate a directional audio warning signal, and audibly projecting the directional audio warning signal to provide an audible indication of the direction, relative to the host platform, of the estimated location of origin of the threat.

According to another embodiment, a threat warning system comprises a threat detection sub-system configured to detect threats and to determine an estimated location of origin of each threat relative to the threat warning system, and a control display unit coupled to the threat detection sub-system and configured to receive the estimated locations of origin of the threats and to display the estimated locations of origin of the threats overlaid on a map, the control unit further configured to calculate a region of overlap between an estimated location of origin of a first threat and an estimated location of origin of a subsequent threat, and to display the region of overlap visually distinguishable from the estimated locations of origin of the first and subsequent threats. In one example, the control display unit includes a video processor and a display screen.

According to another embodiment, a method of warning of a threat comprises detecting a first occurrence of a threat, determining a first estimated location of origin of the threat relative to a host platform, displaying the first estimated location of origin of the threat on a map, detecting a second occurrence of the threat, determining a second estimated location of origin of the threat relative to the host platform, refining the first estimated location of origin of the threat based on overlap between the first and second estimated locations of origin to produce a zone-of-error corresponding to a location of origin of the threat, and displaying the zone-of-error on the map visually distinguished from the first estimated location of origin of the threat.

In one example, the method further comprises displaying the second estimated location of origin of the threat on the map. In another example, the method further comprises iteratively repeating the refining step based on subsequent detected occurrences of the threat.

Still other aspects, embodiments, and advantages of these exemplary aspects and embodiments, are discussed in detail below. Any embodiment disclosed herein may be combined with any other embodiment in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
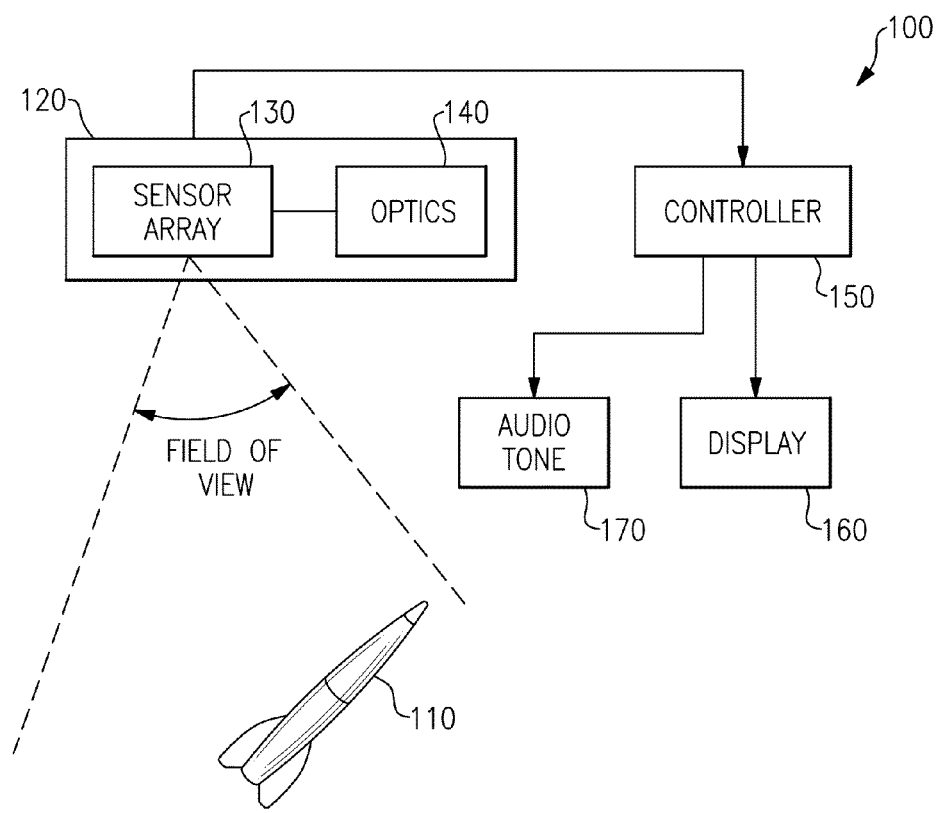
FIG. 1 is a functional block diagram of one example of a conventional missile warning system.

In the adrenaline-laden situation of flying an aircraft while missiles are being shot at it, time becomes critical. A pilot wants to immediately, (1) recognize that a missile is being fired at him; (2) know from what direction was the missile fired and, (3) as he performs evasive flight maneuvers, know where the missile launch site is relative to his current position. Military tacticians would also like better and more reliable information regarding the probable location of a missile site so more precise defensive measures (for example, targeting the site for defeat with greater precision and accuracy) can be taken.

Conventional missile warning systems that provide a monaural warning tone indeed satisfy the first requirement (1) above; however, this tone does not provide any sense of direction to the missile launch site, and thus fails to satisfy requirement (2). As a result, the pilot (or other user) is forced into a "heads-down" position to look at the display 160, meaning he must focus his visual attention, however briefly, to the display 160 to see where the missile launch point was relative to his current position, in order to satisfy requirement (2). A heads-down attitude is not desirable when the pilot is faced with the need to perform rapid evasive maneuvers in response to an incoming missile; rather, the pilot should keep his eyes up, looking ahead during these evasive maneuvers. Compounding this problem is the situation that while maneuvering, the pilot/user must repeatedly return to the "heads-down" position to view the display 160 in order to satisfy requirement (3), namely to determine where is the missile launch point relative to the new position of the host platform following each maneuver.

Furthermore, although existing missile warning systems 100 vary in the accuracy with which they can identify a launch location of detected missile 110 (some able only to identify a quadrant from which the missile likely originated, as discussed above, whereas other, more sophisticated systems may provide a relatively well-defined error ellipse in which the missile launch location is likely present), they do not update location information based on subsequent launches. For example, in cases where a second or third missile is launched, each subsequent missile launch causes the missile warning system 100 to "start afresh," meaning that it only detects and provides information on the most recently launched missile site. Consequently, the most the user knows is from which quadrant (relative to the current position of the host platform) was the most recent missile launch at that moment in time. Conventional missile warning systems provide no historical information about the sum total of all the missile launches, and do nothing to narrow down (pinpoint) the location of the missile launch site based on accumulated information. As a result, conventional missile warning systems offer little defensive opportunity for military tacticians to precisely target and eliminate the launch site.

Aspects and embodiments are directed to an integrated three-dimensional (3D) audiovisual threat warning system that provides both audible and visual indications of a threat location to a user when a threat is detected. In one embodiment, a threat warning system provides a "heads up" visual cue which may be combined with spatial audio to give the user better indications of an approaching threat and allow the user to recognize the location of a launch while maneuvering. For example, 3D audio processing is used to provide the user with a sense of direction to the launch site, as discussed further below. In addition, certain embodiments use graphics processing to provide a more focused or narrowed ellipse-of-error for a probable threat origination/launch site (e.g., a missile launch site) when multiple launches have been detected, as also discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
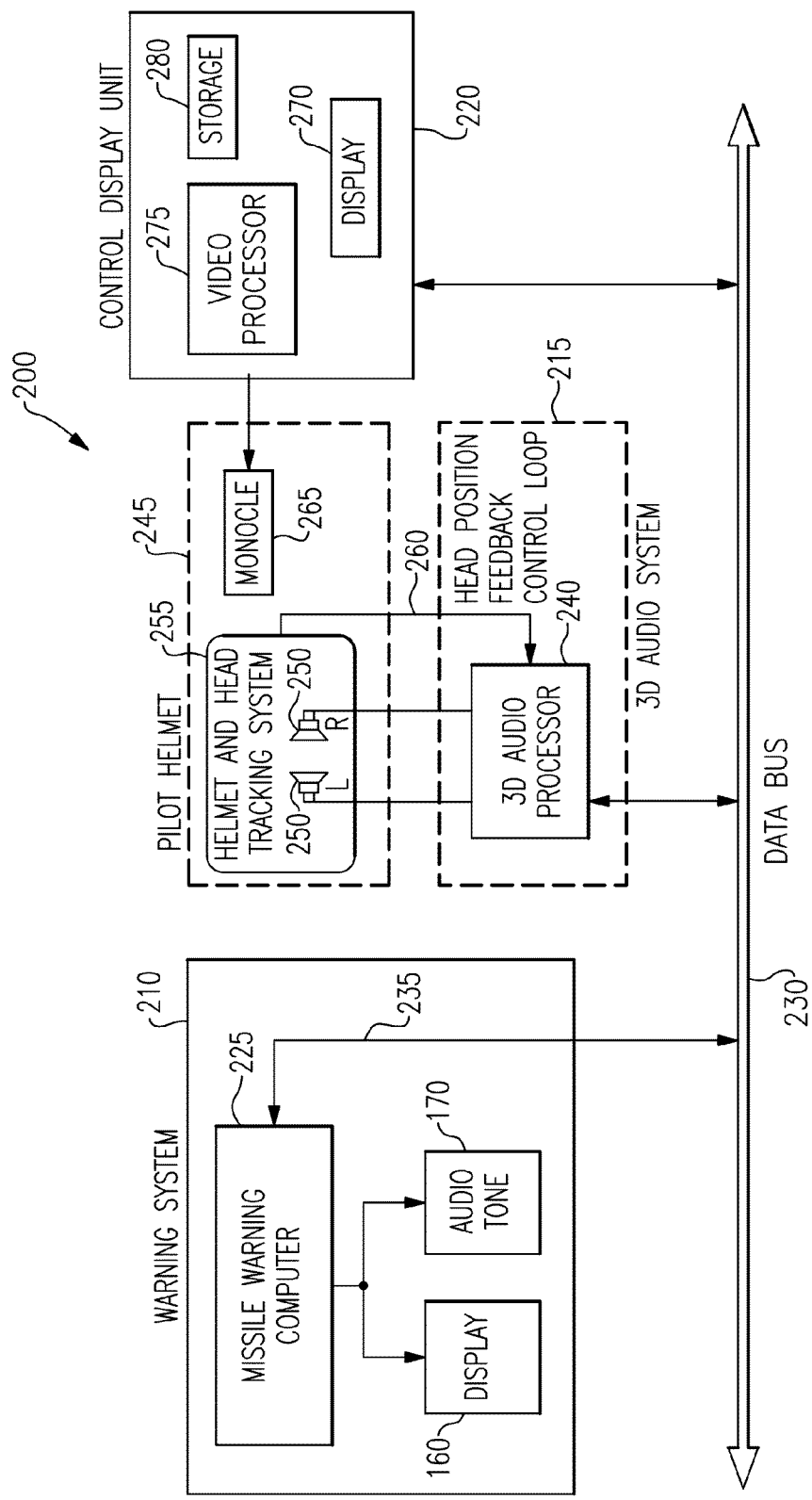
FIG. 2 is a functional block diagram of one example of a threat warning system according to aspects of the invention.

Referring to FIG. 2 there is illustrated a functional block diagram of one example of a threat warning system. According to one embodiment, the system 200 interfaces with a threat warning system 210, for example, a missile warning system as discussed above associated with the host platform. The system 200 includes a three-dimensional (3D) audio system 215 and a control display unit 220, each of which is discussed in more detail below. The various components of the system 200 communicate with one another via a data bus 230 or similar/equivalent communications interface. It is to be appreciated that although the following description may refer primarily to examples in which the threat warning system includes a missile warning system and the host platform is an aircraft (and the user is therefore a pilot of the aircraft), embodiments of the system 200 may be used with a variety of host platforms, not limited to aircraft (for example, boats, submarines, or land vehicles, such as tanks, cars or trucks), and may interface with systems configured to warn of threats other than missiles (for example, torpedoes or gunfire). In addition, as discussed further below, embodiments of the system 200 may be configured to be hand-held or carried by a person rather than mounted on a host platform.

As discussed above, conventional missile warning systems present an audible warning tone to the pilot, and this tone is fixed in frequency and volume, as well as being monotone. Accordingly, the tone serves only to alert the pilot of a missile launch, and after being alerted, the pilot must then focus his attention on the display 160 in order to understand where the missile launch has occurred and, from that, decide if evasive maneuvers are warranted. An improvement offered by one embodiment is to re-route the warning tone from the tone generator 170 to the 3D audio system 215 which is configured to generate audio having a three-dimensional, spatial aspect that conveys a sense of location or orientation to the pilot, as discussed further below. Thus, an immediate indication of the location of the missile launch can be presented to the pilot without the pilot having to look at a display. For example, the processed directional audio warning can be provided to the pilot through speakers 250 in the pilot's helmet 245.

According to one embodiment, a computer (or processor) 225 of the missile warning system 210 is configured to re-route the warning tone to the 3D audio system 215 via the data bus 230, as indicated by arrow 235. Alternatively, the tone generator 170 may be coupled to the data bus 230 and forward the warning tone to the 3D audio system 215. Using available geo-spatial coordinate data about the aircraft (e.g., latitude, longitude, and elevation) from the data bus 230, a 3D audio processor 240 may process those geo-coordinates in combination with the directional missile launch data from the missile warning system 210 and then project the warning tone into three dimensional audible space, fixing it in space at the launch point of the missile. Therefore, as the aircraft maneuvers, the sound associated with the launch point as heard through the helmet speakers 250 remains fixed at that point in space. In this way the pilot gains useful audible information about the location of the launch point relative to the aircraft as he/she maneuvers it. This remedies the forced "heads-down" position required by conventional systems as discussed above, and permits the pilot to maintain a "heads-up" position to better maneuver the aircraft away from the missile site. It is to be appreciated that although a pair of speakers 250 is illustrated in FIG. 2, the system 200 may include more than two speakers 250. For example, a 3D audio system may include two pairs of speakers, or more, per side of the helmet 245, or other speakers mounted in the host platform.

According to a variety of examples, the 3D audio processor 240 is a commercially available processor such as processors manufactured by Texas Instruments, Intel, AMD, Sun, IBM, Motorola, Freescale and ARM Holdings. However, the 3D audio processor 230 may be any type of processor, field-programmable gate array, multiprocessor or controller, whether commercially available or specially manufactured, programmed to perform 3D spatial audio processing. In some examples, the 3D audio system 215 may include storage (not shown) to store the warning tone while it is processed by the 3D audio processor 240. This storage may include, for example, a relatively high performance, volatile, random access memory such as dynamic random access memory (DRAM), static memory (SRAM) or synchronous DRAM. However, the storage may include any device for storing data, such as a non-volatile memory, with sufficient throughput and storage capacity to support the functions described herein.

In certain embodiments the pilot's helmet contains a head tracking system 255, as illustrated in FIG. 2. In such embodiments, information about the direction in which the pilot's head is pointing may be provided to the 3D audio processor 240 in the form of a feedback control loop, represented by arrow 260, and used to maintain accurate directional information in the 3D audio warning signal. For example, the 3D audio processor may use the information provided via loop 260 in combination with the geo-spatial coordinate data about the aircraft and the directional missile launch data from the missile warning system 210 to process the warning tone so that the directional audio warning signal associated with the missile launch point remains at that fixed point in geo-spatial space even as the pilot moves his head side-to-side and up-to-down. In this way, the audible warning is presented to the pilot in a more natural way. Furthermore, having a dynamic and responsive directional aspect to the audio warning is more intuitive to the pilot and thus conveys more information in less time. For example, no matter where the pilot looks, he/she gets reliable 3D audible information conveying an estimate of the true bearing to the missile launch site without having to rely solely on looking at the visual display 160 to get that information.

For example, assume a missile launch is detected at 120° starboard to the aircraft. After the missile warning system 210 detects the launch and issues the warning tone (from audio tone generator 170), the 3D audio processor 240 receives and processes the tone, assigning it to the right-rearward quadrant (because the detection was between 90° and 180°). The processed 3D/directional audio warning is presented to the pilot via the speakers 250, and the pilot hears the audio warning coming from behind him over his right shoulder. Next, assume the pilot performs an evasive maneuver by changing his course to the left by 80°. The 3D audio processor 240, reading this change in aircraft heading from the data bus 230, then re-calculates the bearing to the missile launch point and moves the audio warning to the left-rearward quadrant (120°+80°=200° because the launch point is now between 180° and 270° relative to the aircraft heading). As a result of the pilot's 80° maneuver, the 3D audio processor 240 moves the audio warning to sound as though it is now coming from behind the pilot over his left shoulder. Thus, the directional aspect of the 3D audio warning is dynamically updated responsive to movement of the aircraft to supply the pilot with real-time, accurate, non-visual information regarding the estimated missile launch site. In addition, in embodiments in which the pilot's helmet contains a head tracking system 255, the 3D audio processor 240, via the feedback control loop 260, is configured to continually move the apparent position of the directional warning inside the pilot's helmet speakers 250 so that as the pilot swivels his/her head, the sound remains fixed at the correct point in space of the missile launch site relative to the aircraft's current position. Thus, a dramatic improvement in presenting real-time audible information about the location of the missile launch point may be achieved.

As discussed above, conventional missile warning systems 100 do not maintain any historical information about previous missile launches. Therefore, no opportunity is provided to triangulate, or otherwise narrow-down, the location of the probable launch point of the missiles. Various aspects and embodiments recognize and address this deficiency. For example, in one embodiment, the control display unit 220 is programmed to maintain a history of each missile launch as detected by the missile warning system 210 and to incorporate this information into the display presented to the user, as discussed further below. In addition, certain embodiments incorporate a display that includes presentation of a moving map, synchronized to movement of the host platform, with a graphical overlap on the map illustrating the estimated location of a missile launch site, or other detected threat.

Still referring to FIG. 2, one embodiment of the threat warning system 200 includes the control display unit 220. In one example, this control display unit 220 includes a display screen 270 and associated video processor 275, and may replace or be supplemental to the missile warning system display 160. In another example, the control display unit 220 may include the video processor 275 configured to control a separate display, such as the display 160. It is to be appreciated that although the following discussion of examples may refer primarily to a display presented by the control display unit 220, the principles discussed herein may be applied to numerous display options and configurations, including the above-discussed variations. In addition, the video processor 275 of the control display unit 220 may be configured to run a variety of programs and/or algorithms to implement the video processing functions necessary to display the maps and other visual features discussed below. According to a variety of examples, the video processor is a commercially available processor such as processors manufactured by Texas Instruments, Intel, AMD, Sun, IBM, Motorola, Freescale and ARM Holdings. However, the video processor 275 may be any type of processor, field-programmable gate array, multiprocessor or controller, whether commercially available or specially manufactured. In some examples, control display unit 220 may also include storage 280 associated with the video processor, such as for example, a relatively high performance, volatile, random access memory such as dynamic random access memory (DRAM), static memory (SRAM) or synchronous DRAM. However, the storage 280 may include any device for storing data, such as a non-volatile memory, with sufficient throughput and storage capacity to support the functions described herein.

According to one embodiment, the control display unit 220 is configured to present a moving map. For example, as the pilot flies the aircraft, his/her position over the ground is depicted as a fixed icon in the center of the control display unit 220 with the map moving underneath that fixed icon. In one embodiment, the control display unit 220 is configured to add a graphical overlay to the map such that when the missile warning system 210 detects a missile launch, the control display unit 220 shows a ground-stabilized polygon (for example, a quadrant, wedge, or ellipse) representing the estimated launch site on the moving map.

Figure 3:
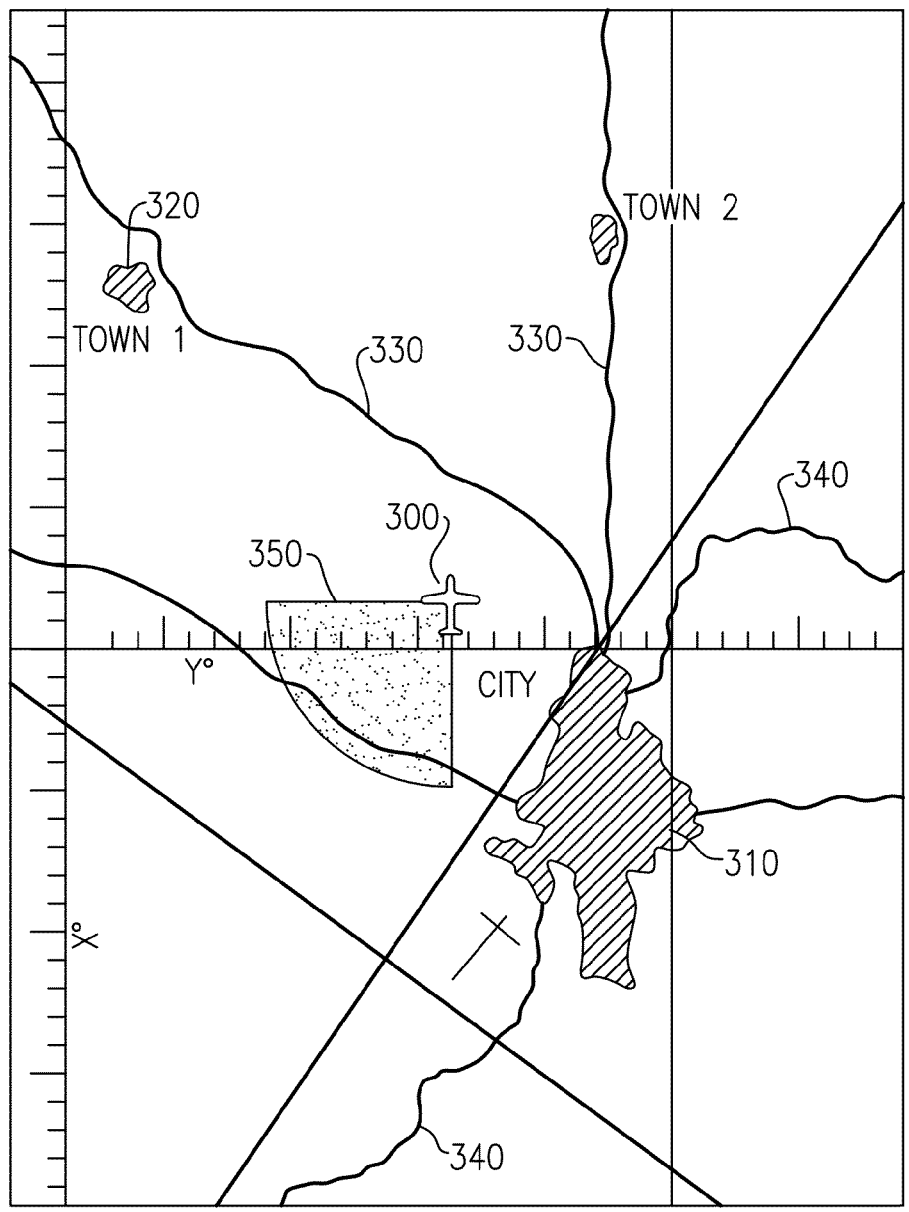
FIG. 3 is a diagram of one example of a map display including a visual indication of an estimated location of origin of a detected threat.

Referring to FIG. 3, there is illustrated an example of a display illustrating a moving map, with the aircraft shown as an icon 300 in the center of the display. The map may depict topographical and geographical features of the terrain over which the aircraft is flying such as, for example, cities 310, towns 320, roads 330 and rivers 340. In addition, the map may include latitude and longitude data, such as a latitude and longitude grid overlay, which is generally not present in conventional missile warning system displays. A pie sector 350 indicates the location of the missile launch site as detected by the missile warning system 210. In the illustrated example, this pie sector is shown in the left-rearward quadrant of the aircraft 300. By overlaying the missile warning system 210 detection information onto the moving map of the control display unit 220, embodiments of the threat warning system 200 may provide an immediate improvement in the refinement of the visual data because now the pilot can see the location of the missile launch quadrant on the map, particularly relative to the latitude and longitude data. As a result, the pilot can know where the possible launch site is using map coordinates. This information may also be forwarded to other systems associated with, or remote from, the host platform, such as, for example, a command station that may direct resources to investigate or target the possible launch site.

According to another embodiment, a further refinement and/or improvement to the moving map display includes displaying subsequent threat events (e.g., subsequent missile launches) and using the combined data from multiple launches to narrow-down the possible location of the launch site. In one example, the threat warning system 200 both maintains in memory (not shown) and actively displays all missile launches on the moving map. The control display unit 220 may be configured to calculate the union of multiple launch quadrants 350 and visually code areas of overlap, for example, by using different colors or shades of color. Thus, a narrowed zone-of-error for the probable launch site is achieved (i.e., the system may help to pinpoint the site). In another example, the control display unit 220 updates the display to show only the narrowed zone-of-error calculated from the overlap of two or more threat detections, without continuing to display the quadrants 350 associated with each launch. This may simplify the display for the user, particularly in circumstances where numerous threats occur in a relatively short time frame.

Figure 4:
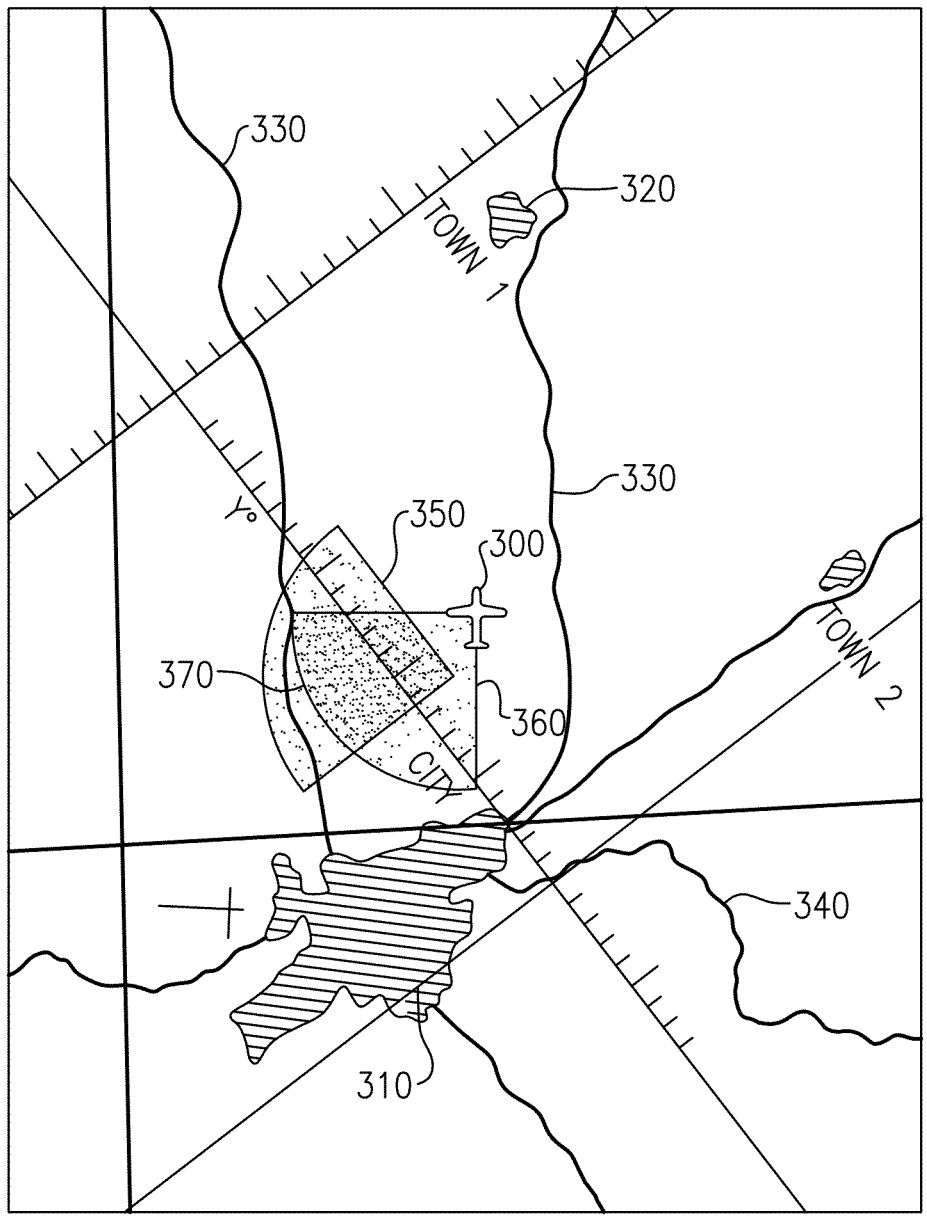
FIG. 4 is a diagram of one example of the map display of FIG. 3 updated to include information regarding detection of a subsequent threat.

Referring to FIG. 4, there is illustrated an example of the moving map display configured to show the quadrant 360 associated with a second detected missile launch, and the area of overlap corresponding to the refine zone-of-error 370. In FIG. 4, the first missile launch quadrant 350 is shown affixed to the map, graphically illustrating the location of the first detection as shown in FIG. 3). In this example, as the pilot maneuvers the aircraft, a second missile launch is detected by the missile warning system 210, and the control display unit 220 displays that second launch detection as the quadrant 360 shown on the right of the two displayed quadrants 350, 360 in FIG. 4. As discussed above, in one embodiment, the control display unit then calculates the union of the two quadrants 350, 360 (i.e. the area where they overlap) to produce the refined zone-of-error 370, and visually distinguishes that zone from the two quadrants, for example, by shading the area a darker color. This union or zone-of-error 370 represents the most probable location of the missile launch site. As illustrated in FIG. 4, the zone-of-error 370 is smaller than either single quadrant 350, 360, and the system thus helps to pinpoint the location of the missile site. The control display unit may be configured to continue calculating the unions of any subsequent launches to further reduce the zone-of-error 370.

Figure 5:
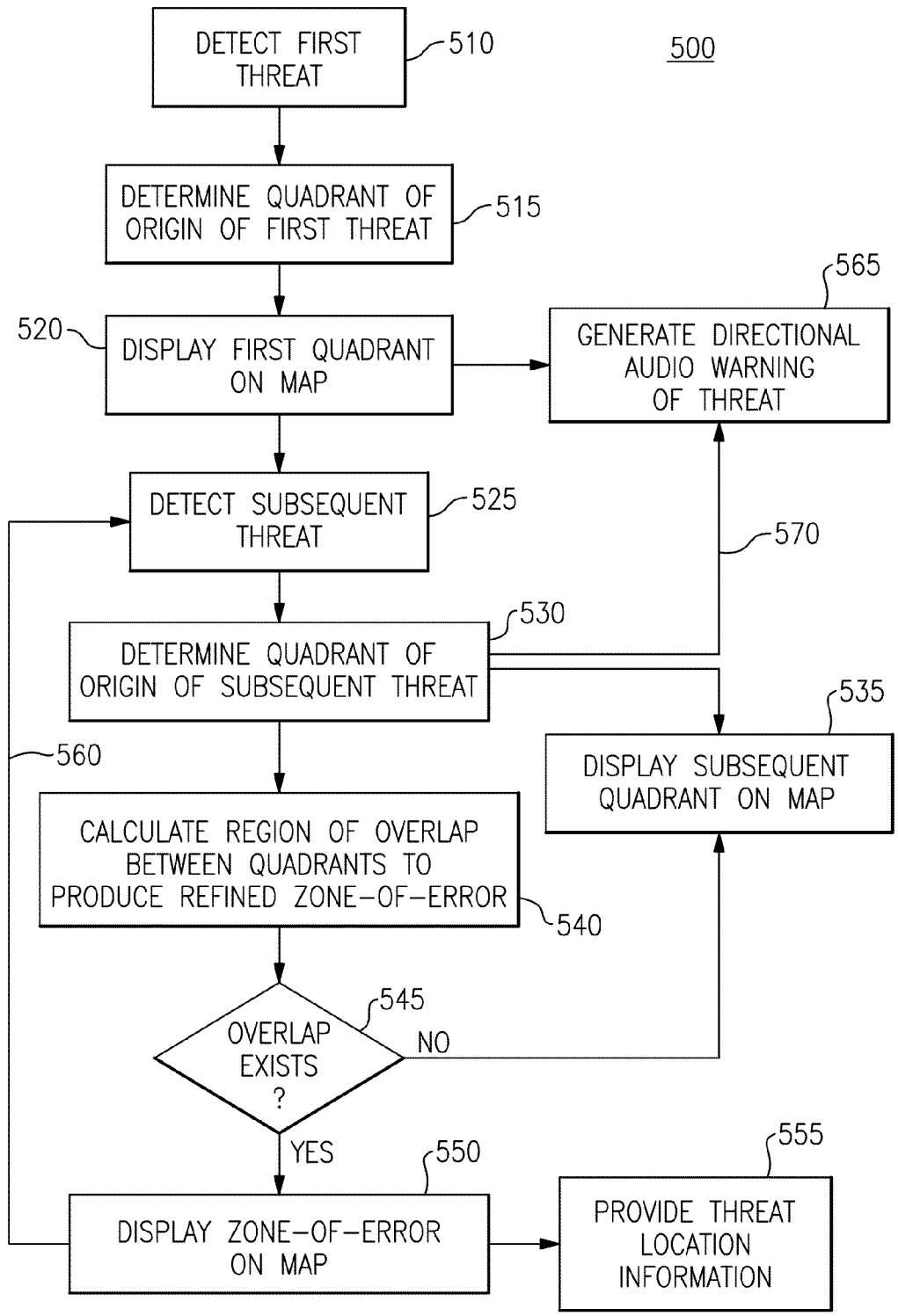
FIG. 5 is a flow diagram illustrating one example of a process of warning a user of detected threats according to aspects of the invention.

FIG. 5 illustrates a flow diagram of one example of the above-discussed process. In a first step 510, a first threat is detected by a threat detection sub-system, such as the missile warning system 210. An estimated relative location of origin of the first threat with respect to the host platform is determined in step 515. As discussed above, this relative location of origin may be a quadrant, such as quadrant 350 illustrated in FIG. 3, or may be a polygon of a different shape. The quadrant (or other location of origin of the threat information) may be determined by the threat detection sub-system (e.g., the missile warning system 210) and communicated to the control display unit 220 via the data bus 230. The control display unit 220 displays the relative location of the threat on the map (e.g., quadrant 350) in step 520. As discussed above, embodiments of the threat warning system 200 are also configured to generate a direction audio warning of the threat. Accordingly, the process 500 may include a step 565 of playing an audible directional warning sound to an occupant of the host platform. The direction of the warning sound corresponds to the relative location of the threat displayed on the map. For example, in FIG. 3, the quadrant 350 is displayed to the left-rear of the host platform icon 300, and the audible warning signal would similarly sound to the left-rear of the user.

In step 525 a subsequent threat is detected by the threat detection sub-system, and the estimated relative location of the subsequent threat is determined (step 530). In embodiments of a combined audio-visual threat warning system 200, an updated audible directional warning sound is played (step 565), audibly indicating the direction of the origin of the threat relative to the current position of the host platform. In some embodiments, as discussed above, the display is updated to display the relative location of the subsequent threat (e.g., quadrant 360), as illustrated in FIG. 4 (step 535). The visual indication of the first threat remains fixed to the map, as shown in FIG. 4, and the visual indication of location of the subsequent threat is overlaid, position relative to the host platform which is indicated at the center of the display. As discussed above, the control display unit 220 is configured (for example, via a process implemented by its video processor) to calculate the region of overlap between the quadrants corresponding to the first and subsequent detected threats (step 540) to produce a refined or narrowed zone-of-error 370. This zone-of-error 370 is displayed on the map (step 550), as discussed above, either alone or in conjunction with either or both of the quadrants 350, 360. The process may be repeated for additional threat detections, as indicated by arrow 560. The zone-of-error 370 may thus continue to be narrowed or refined to pinpoint the estimated location of origin of the threats (e.g., a missile launch site).

In some instances, there may be no overlap between the first and second quadrants determined in steps 515 and 530, for example, where the location of origin of the first threat was mis-identified or where the first and subsequent detected threats in fact originate from different locations. Accordingly, the system may modify the displayed information based on the outcome of decision 545. For example, if the control display unit calculates no overlap between the first and second quadrants 350, 360, both quadrants may be displayed on the map (step 535). Additional subsequent threat detections may then be used to calculate a zone-of-error (steps 525, 530 and 540) based on either (or any prior-determined) quadrant.

As discussed above, the control display unit may also communicate the zone-of-error location information to other systems associated with the host platform or remote from the host platform (step 555), for example to allow the host platform or a remote command station to warn other vehicles to avoid the possible location of origin of the threat(s) or to target that location for attack.

Referring again to FIG. 2, in one embodiment the threat detection system 200 includes a monocle 265 mounted in the helmet 245. Accordingly, embodiments of the threat warning system 200 may further improve the visual presentation of missile warning system data to the pilot by projecting video data onto the monocle 265. Similar to the way in which the control display unit is configured to show the quadrants 350, 360 on the map display, the system may be further configured to overlay the quadrants 350, 360 and/or zone-of-error 370, or similar information, on the pilot's heads-up monocle 265. According to one embodiment, the monocle 265 is designed to show only contextual information related to the direction in which the pilot's head is turned, and the control display unit 220 is therefore configured to modify the threat warning video data before it is presented to the monocle 265. For example, the monocle 265 can be thought of to operate in a manner similar to that when one peers through a telescope at the night sky. That is, the sky remains fixed, and the image one sees through the telescope changes depending on where the telescope is pointing at the sky. Similarly, the information presented through the monocle 265 is contextually based on where the pilot's head is turned. In one embodiment, the control display unit 220 is configured to take into account this contextual operation of the monocle 265 and to accordingly modify the video picture of the missile warning system video signal shown on the monocle.

Figure 6:
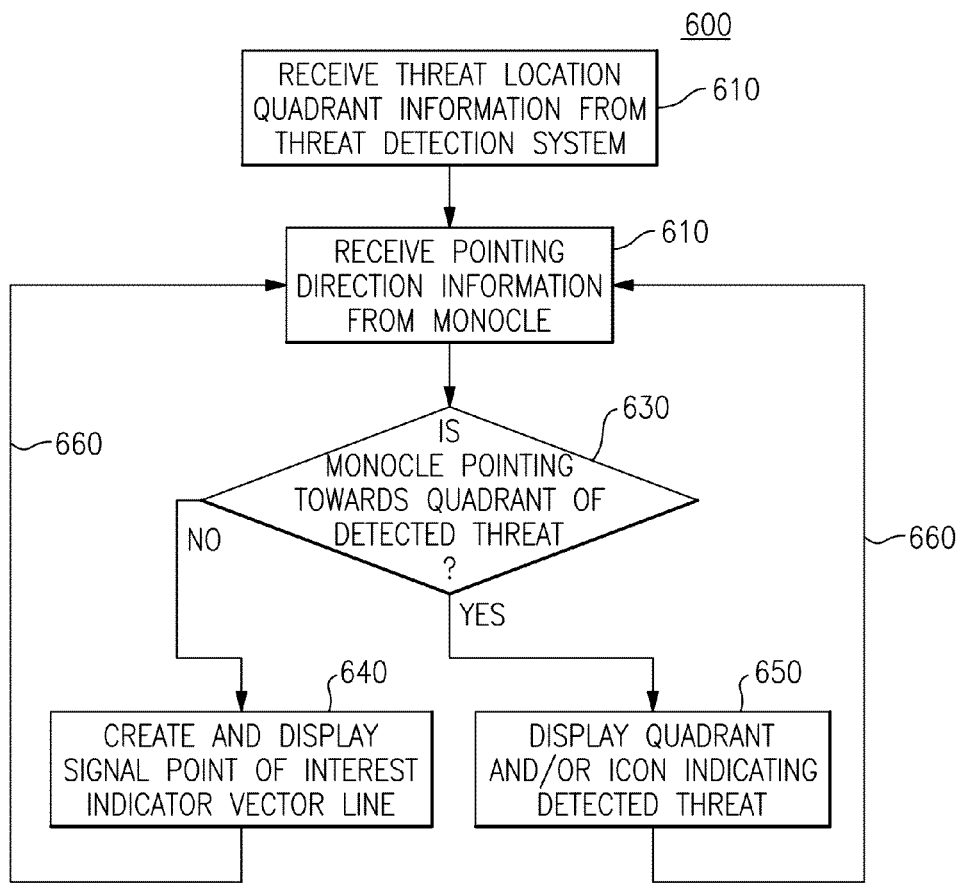
FIG. 6 is a flow diagram illustrating one example of a process of displaying threat detection information through a helmet-mounted monocle according to aspects of the invention.

For example, when the pilot hears an audible missile warning signal at a fixed point in three-dimensional space (as discussed above), he/she may instinctively turn his/her head in the direction of the sound. According to one embodiment, the control display unit is configured to simultaneously (or near-simultaneously) send the missile warning system video data to the monocle 365 in the following way. As illustrated in FIG. 2, the monocle 265 has two-way communication with the control display unit 220, and transmits to the control display unit information regarding the direction in which the helmet 245 (i.e. the pilot's head), and therefore the monocle, is pointing. Referring to FIG. 6, in step 610, the control display unit receives information indicating a quadrant (relative to the host platform) of estimated origin of the threat (for example, a missile launch site, as discussed above) from the threat detection sub-system (for example, the missile warning system 210). The control display unit 220 also receives pointing direction information from the monocle 265 (step 620). It is to be appreciated that steps 610 and 620 do not necessarily need to be performed sequentially in the order shown in FIG. 6. For example, step 620 may be performed before or essentially simultaneously with step 610.

Figure 7:
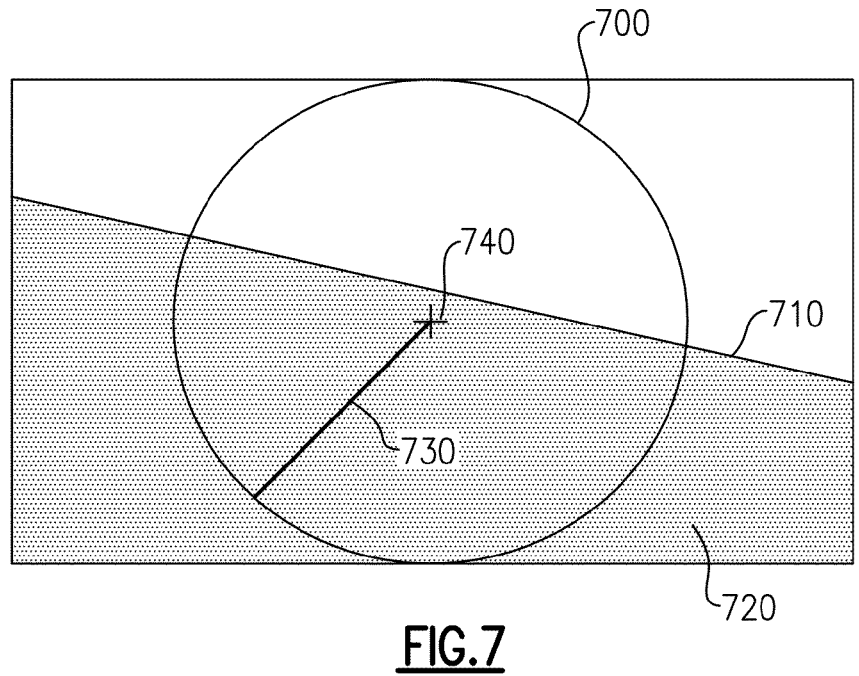
FIG. 7 is one example of a monocle display according to aspects of the invention.
Figure 8:
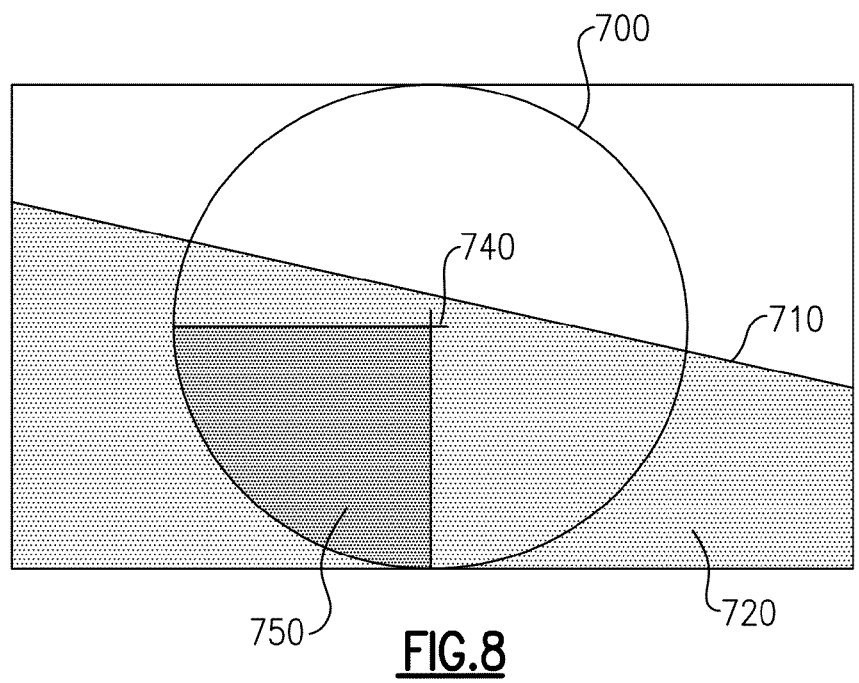
FIG. 8 is another example of the monocle display according to aspects of the invention.

In one embodiment, the manner in which the missile warning system video data is displayed at the monocle 265 depends on whether or not the monocle is pointing in the direction of the quadrant in which the missile launch is estimated to have occurred, as represented by decision block 630. If the pilot's head position (and therefore the monocle 265) is not looking towards the quadrant of the detected missile launch, the control display unit 220 may be configured to create a signal point of interest indicator vector line indicating the direction to the missile launch quadrant (step 640). An example of a monocle display 700 is illustrated in FIG. 7. In FIG. 7, line 710 represents the horizon, and the area below the line will be a visualization or map of the terrain over which the aircraft is moving. It is to be appreciated that the angle and vertical location of the horizon line 710 will vary depending on the attitude of the aircraft. Similarly, if the host platform is a vehicle other than an aircraft, horizon line 710 may vary in angle and location, or may represent a visual distinction other than the horizon, for example, a water line in submarine applications. The signal point of interest indicator vector line 730 extends from the center 740 of the display to an edge, in the direction of the quadrant in which the missile launch (or other threat) was detected. If the pilot is looking in the direction of the missile launch quadrant, then the control display unit may present a shaded (or otherwise visually distinguishable) region 750 corresponding to the quadrant, as illustrated in FIG. 8, or an icon on the monocle display 700 indicating that a missile launch was detected (step 650). The control display unit 220 may be configured to control the monocle display to automatically switch back and forth between FIGS. 7 and 8 (or similar representations) in response to feedback from the monocle 265 indicating that the pilot is moving his/her head. The displayed information may further be updated responsive to detection of subsequent threats, as discussed above.

Figure 9:
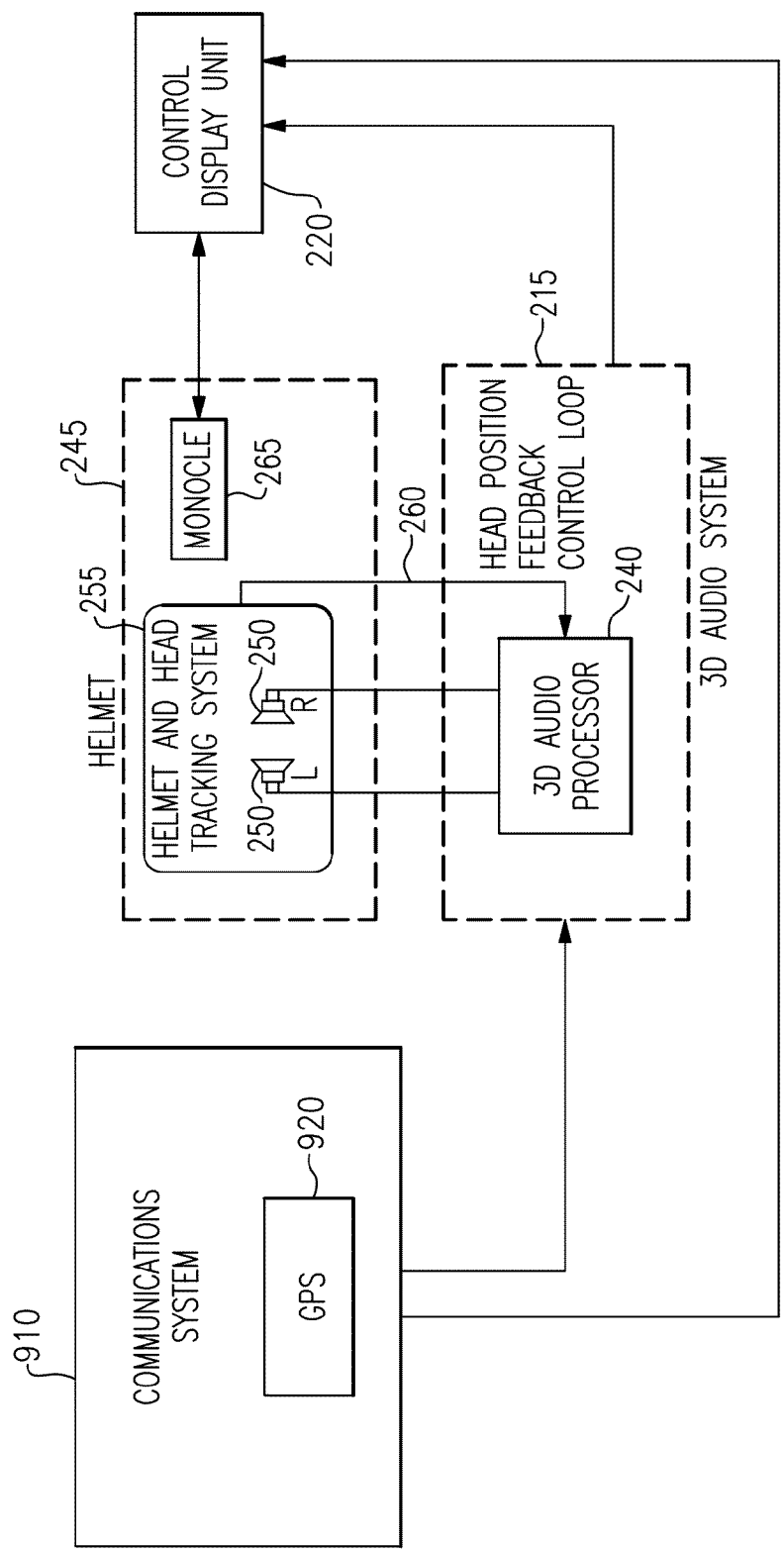
FIG. 9 is a block diagram of one example of a situational awareness system according to aspects of the invention.

Thus, various embodiments of the threat warning system discussed above may improve the quality of information presented to an aircraft pilot about missile launches, both audibly and visually, and offer advancements over the conventional presentation of missile warning system data. Dynamically updating visual information is displayed to the pilot in a concise manner, and optionally through the monocle 265 such that the pilot can scan the probable threat area while continuing to maneuver the aircraft and maintaining awareness of subsequent threats. In addition, the pilot's situational awareness may be further enhanced through the use of spatial audio cues, as discussed above, so that the pilot can be made aware of the relative location of future threat warnings without the need to look into to cockpit (i.e., at a "heads-down" display) even if the subsequent warning is of a threat coming from a direction in which he/she is not currently looking. These improvements and advantages may be similarly experienced by users associated with host platforms other than aircraft, such as, for example, ships, submarines, cars, tanks or trucks. In addition, as discussed above, embodiments of the threat warning system may be configured to warn of threats other than missile launches, such as torpedo or rocket launches, gunfire, etc. For example, a threat-detection sub-system may be configured to detect the source of gunfire based on echo location. A corresponding hand-held and/or helmet-mounted threat warning system, including earphones (or another speaker system), may then be configured to provide three-dimensional audiovisual information, as discussed above, to show the detected source of the gunfire relative to the user's geographic location In addition, in other embodiments the missile warning system 210 (or other threat detection sub-system) may be replaced with a communications system 910 having an embedded global positioning system (GPS) unit 920, as illustrated in FIG. 9. The GPS unit 920 is configured to track the system's orientation and location, similar to current commercial GPS systems. Examples of a suitable communications system 910 include, but are not limited to, cellular telephones and RF radio systems. In one such embodiment, the control display unit 220 is configured to display a moving map, as discussed above, with an icon representing the user (for a mobile system) or host platform at the center, and the relative location(s) of other user(s) or host platform(s) overlaid onto that map. The location(s) of the other user(s) or host platform (s) are received/determined by the communications system 910. Received audio from the other user(s) or host platform(s) may be presented in 3D audio (as discussed above) to the user of the system via the earphones 250 to provide an improved sense of situational awareness.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An integrated audiovisual threat warning system comprising:
 a threat detection sub-system configured to detect a threat and, responsive to detection of the threat, to generate a warning tone and an estimated relative location of origin of the threat with respect to a host platform with which the threat warning system is associated;
 an audio processor coupled to the threat detection sub-system and configured to receive the warning tone, geo-spatial coordinate data from the host platform, and the estimated relative location of origin of the threat, and to process the warning tone based on the geo-spatial coordinate data and the estimated relative location of origin of the threat to generate a directional audio warning signal;
 a plurality of speakers coupled to the audio processor and configured to audibly project the directional audio warning signal to audibly identify the estimated relative location of origin of the threat;
 a display screen; and
 a video processor coupled to the threat detection sub-system and to the display screen, and configured to receive the estimated relative location of origin of the threat and to control the display screen to display the estimated relative location of origin of the threat overlaid on a map, the video processor being further configured to calculate a region of overlap between estimated relative locations of origin of successively detected threats and to control the display screen to display the region of overlap overlaid on the map and visually distinguished from the estimated relative location of origin of the threat.

2. The integrated audiovisual threat warning system of claim 1, wherein the threat detection sub-system is a missile warning system.

3. The integrated audiovisual threat warning system of claim 1, wherein the plurality of speakers is mounted in a helmet.

4. The integrated audiovisual threat warning system of claim 3, further comprising a monocle mounted to the helmet and coupled to the video processor, and wherein the video processor is configured to control the monocle to display an indication of the estimated relative location of origin of the threat.

5. The integrated audiovisual threat warning system of claim 4, further comprising a helmet tracking system coupled to the video processer and configured to track a pointing direction of the monocle and to provide the pointing direction to the video processor.

6. The integrated audiovisual threat warning system of claim 5, wherein the video processor is further configured to determine whether the pointing direction corresponds to a direction of the estimated relative location of the origin of the threat and, responsive to the determination, alter the indication of the estimated relative location of the origin of the threat displayed by the monocle.

7. A method of warning an occupant of a host platform of a threat comprising:
 detecting a first threat;
 generating a warning tone responsive to detection of the first threat;
 determining a first estimated location of origin of the first threat relative to the host platform;
 displaying the first estimated location of origin of the first threat on a map, the first estimated location of origin of the first threat being fixed to the map;
 receiving geo-spatial coordinate data from the host platform;
 processing the warning tone based on the geo-spatial coordinate data and the first estimated location of origin of the first threat to produce a directional audio warning signal;
 audibly projecting the directional audio warning signal to provide an audible indication of a direction, relative to the host platform, of the first estimated location of origin of the first threat;
 detecting a second threat;
 determining a second estimated location of origin of the second threat relative to the host platform;

displaying the second estimated location of origin of the second threat on the map;
calculating a region of overlap between the first estimated location of origin of the first threat and the second estimated location of origin of the second threat; and
displaying the region of overlap on the map, visually distinguished from the first and second estimated locations of origin of the first and second threats, respectively.

8. The method of claim 7, further comprising:
refining the first estimated location of origin of the first threat based on the region of overlap between the first and second estimated locations of origin to produce a zone-of-error corresponding to a location of origin of the first threat; and
displaying the zone-of-error on the map visually distinguished from the first estimated location of origin of the first threat.

9. The method of claim 8, further comprising iteratively repeating the refining step based on subsequent detected threats.

10. The method of claim 7, further comprising:
determining a facing direction of a monocle configured for use by the occupant; and
determining whether the facing direction is toward the first estimated location of origin of the first threat.

11. The method of claim 10, further comprising displaying in the monocle an icon representative of the first estimated location of origin of the first threat responsive to determining that the facing direction is toward the first estimated location of origin of the first threat.

12. The method of claim 10, further comprising displaying in the monocle a signal point of interest vector line pointing in a direction of the first estimated location of origin of the first threat responsive to determining that the facing direction is not toward the first estimated location of origin of the first threat.

13. The method of claim 7, wherein audibly projecting the directional audio warning signal includes playing a sound in helmet speakers, the helmet configured for use by the occupant.

14. The method of claim 13, further comprising:
monitoring movement of the helmet; and
updating the directional audio warning signal based on the movement of the helmet to adjust the audible identification the first estimated relative location of origin of the first threat responsive to the movement.

15. The method of claim 7, further comprising:
updating the geo-spatial coordinate data based on movement of the host platform; and
processing the warning tone based on the updated geo-spatial coordinate data to update the directional audio warning signal to adjust the audible identification of the first estimated relative location of origin of the first threat responsive to the movement.

16. An integrated audiovisual threat warning system comprising:
a threat detection sub-system configured to detect threats and to determine the estimated location of origin of each threat relative to the threat warning system;
an audio tone generator configured to generate a warning tone responsive to detection of each threat;
an audio processor unit configured to receive the warning tone, geo-spatial coordinate data from a host platform with which the threat warning system is associated, and direction information indicating a direction, relative to the host platform, of an estimated location of origin of each threat, and to process the warning tone based on the geo-spatial coordinate data and the direction information to generate a directional audio warning signal;
a plurality of speakers coupled to the audio processor unit and configured to audibly output the directional audio warning signal including an audible indication of the direction, relative to the host platform, of the estimated location of origin of each threat; and
a control display unit coupled to the threat detection sub-system and configured to receive the estimated locations of origin of the threats and to display the estimated locations of origin of the threats overlaid on a map, the control unit further configured to calculate a region of overlap between an estimated location of origin of a first threat and an estimated location of origin of a subsequent threat, and to display the region of overlap visually distinguishable from the estimated locations of origin of the first and subsequent threats.

17. The integrated audiovisual threat warning system of claim 16, further comprising a helmet including a head tracking system, the plurality of speakers being mounted in the helmet;
wherein the head tracking system is configured to monitor movement of the helmet and provide a movement signal representative of the movement to the audio processor; and
wherein the audio processor is further configured to process the warning tone based on the movement signal to update the audible indication of the direction of the estimated location of origin of the threat responsive to the movement of the helmet.

* * * * *